United States Patent Office 2,887,460
Patented May 19, 1959

2,887,460

STABILIZED LATEX COATING COMPOSITIONS CONTAINING REACTIVE PIGMENTS AND GLYCOLAMINE STABILIZERS AND METHOD FOR PREPARING SAME

Carl L. Dibert, St. Louis, and Dudley A. Taber, Midland, Mich., assignors to The Dow Chemical Company, Midland, Mich., a corporation of Delaware No Drawing. Application December 27, 1955
Serial No. 555,248

16 Claims. (Cl. 260—29.6)

This invention relates to film-forming aqueous dispersions comprising organic polymers and reactive pigments such as zinc oxide. It relates especially to such dispersions that comprise film-forming copolymers of aliphatic conjugated diolefins and monovinylaromatic compounds. It particularly concerns latex coating compositions, such as latex paints, that comprise zinc oxide and/or calcium sulfate-extended titanium dioxide and a novel stabilizer, and a method of making such compositions.

Film-forming aqueous dispersions comprising organic polymers are well known. Aqueous dispersions of film-forming resinous and/or elastomeric polymers such as copolymers of butadiene and styrene have been employed as, or in the preparation of, coating compositions such as the so-called latex paints. Usually, in the making of latex coating compositions such as latex paints, finely divided solid pigments and fillers are admixed with the aqueous dispersions of film-forming polymers together with suitable dispersing agents and stabilizers. The choice of particular materials is usually limited by the requirement that the resulting composition be a stable dispersion, i.e., one in which the dispersed materials remain well dispersed, and which does not thicken, gel, separate, or coagulate on standing at room temperature in a closed container, at least long enough for the dispersion to be employed as a coating composition.

In many instances, it would be advantageous to employ latex coating compositions containing zinc oxide, e.g. in a latex paint for exterior use. However, many latex paints that have heretofore been compounded with ordinary zinc oxide pigments have not been satisfactory because such paints have not been sufficiently stable. Latex paints, for example, that have been compounded from styrene-butadiene copolymer latexes by admixing therewith solid pigments comprising the usual kind of zinc oxide tend to thicken on standing, i.e., the viscosity increases. Sometimes the dispersion gels, or a portion may separate from the remainder as a layer or as lumps. A complete coagulation of the dispersion sometimes occurs. Such changes in the properties and characteristics of latex-pigment compositions cause difficulties when the compositions are to be applied, and often render the compositions useless.

The difficulties encountered in the preparation of suitable latex coating compositions comprising ordinary zinc oxide pigments have been circumvented in a manner disclosed in a patent application, Serial No. 336,019, filed February 9, 1953, now U.S. Patent No. 2,727,012, by employing as the zinc oxide pigment material one in which the particles of zinc oxide had been coated with an impervious layer of zinc phosphate and by including in the aqueous dispersion a specific amount of a beta-oxyalkyl-amine salt of oleic acid as stabilizer. Although latex coating compositions comprising zinc oxide and possessing satisfactory stability can be prepared thereby, the aforementioned patent indicates that both the special kind of zinc phosphate-coated zinc oxide and the beta-oxyalkyl-amine oleate were necessary to provide such stability. The teachings of the patent do not supply any means for making stable latex coating compositions from ordinary zinc oxide-containing pigments.

Among other potentially useful pigments that usually cause thickening or coagulation of polymer aqueous dispersions when added thereto are the so-called calcium sulfate-extended titanium dioxide pigments, i.e. pigments that are obtained either by coprecipitating or mechanically blending calcium sulfate with titanium dioxide and that comprise appreciable proportions of calcium sulfate. Herein, pigments that tend to cause thickening or coagulation of film-forming polymer aqueous dispersions when admixed therewith are referred to as "reactive" pigments and are usually pigments that consist essentially of, or contain as impurity in appreciable proportion, an ingredient that, when dispersed in an aqueous medium, supplies an appreciable concentration of polyvalent metal cations to such aqueous medium. The invention is particularly concerned with reactive pigments selected from the group consisting of zinc oxide pigments and calcium sulfate-extended titanium dioxide pigments.

An object of this invention is to provide improved aqueous dispersions comprising film-forming polymers and reactive pigments such as zinc oxide pigments and calcium sulfate-extended titanium dioxide pigments.

A more specific object is to provide means for stabilizing a pigmented aqueous dispersion comprising such reactive pigment and a film-forming polymer aqueous paint latex that tends to coagulate in the presence of such pigment by adding thereto an effective proportion of a stabilizer.

Another object is to provide such dispersions that are suitable for use as, or in the preparation of, coating compositions.

Other objects and advantages of the invention will be evident in the following description.

The objects of this invention have been attained in aqueous colloidal dispersions comprising film-forming organic polymers, solid pigments including reactive pigments such as pigment zinc oxide and calcium sulfate-extended titanium dioxide pigment, and a novel stabilizing agent for such aqueous dispersions.

It has now been discovered that such film-forming aqueous coating compositions comprising reactive pigments are stabilized by incorporating therein as a novel stabilizing agent a glycolamine selected from the class of glycolamines having the generic formula

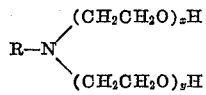

wherein the symbol R— represents an aliphatic radical having at least eight carbon atoms, preferably from eight to 18 carbon atoms, the symbols $x$ and $y$ represent integers the sum of which is at least two, and the other symbols have their usual meanings, which glycolamine is further characterized as being capable of forming a solution in water at room temperature that contains 10 percent by weight of the glycolamine and that has a cloud point temperature of not more than 95° C. as hereinafter defined.

Glycolamines of the kind just specified are well known materials and methods for their preparation are also well known. Usually these glycol amines are prepared from an aliphatic primary amine by condensation thereof with ethylene oxide in the presence of an alkaline catalyst according to the equation:

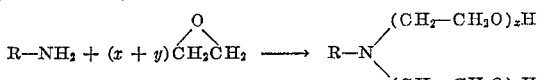

wherein the symbols have the meanings hereinbefore given. The aliphatic primary amine can be an individual amine or a mixture thereof. Good starting materials are the mixtures of long chain aliphatic primary amines that are derived from the fatty acid radicals of natural glyceride oils, particularly the amines having from 8 to 18 carbon atoms in the aliphatic radical, especially the aliphatic amines whose aliphatic radical lengths and configuration correspond to the radicals of the fatty acids of coconut oil, tallow, soybean oil, or of stearic acid, oleic acid, or palmitic acid. Specific examples of individual amines that can be employed alone or in admixture as starting materials for making the glycolamines employed herein are n-octylamine, n-decylamine, n-dodecylamine, n-tetradecylamine, n-hexadecylamine, n-octadecylamine, n-octadecenylamine, and n-octadecadienylamine.

Depending upon the kind and length of the aliphatic radical of the primary amine starting material, the number of ethylene oxide units condensed therewith, and the distribution of ethoxy groups in the condensation product, the resulting glycolamines are known to differ in respect to their behavior in water. Generally speaking, the most suitable glycolamines of the kind herein described as stabilizers for the purposes of this invention are those that are soluble in water to the extent of at least 10 percent by weight at room temperature, although in some instances benefits do accrue from use of less soluble glycolamines. Many of the glycolamines that are soluble in water are less soluble at higher than at lower temperatures. For example, in some instances when clear solutions of 10 percent by weight of certain glycolamines in water are warmed, the solutions become cloudy at a temperature called the "cloudpoint" above which the solutions are cloudy and below which the solutions are clear. Generally speaking, the glycolamines that are most suitable for the purposes of this invention are those whose 10 percent by weight solutions in water have cloud point temperatures not greater than 95° C.

While the solubility and cloud point temperature of a gycolamine of this kind depend to some extent on the mode of preparation, glycolamines meeting the specifications just named are in general those containing from 2 to about 10 ethoxy units chemically combined therein, i.e., glycolamines having the afore-mentioned generic formula wherein the sum of $x$ and $y$ is from 2 to about 10 and wherein the total number of carbon atoms is from 12 to 38. Glycolamines of this kind having less than two ethoxy units are not sufficiently soluble in water. Those having more than ten ethoxy units usually have cloud point temperatures greater than 95° C. and are not suitable for the present purposes.

Specific glycolamines that meet these specifications and that can be used as stabilizers for coating compositions according to this invention are illustrated in the examples that follow hereinafter.

The improved coating compositions of this invention are dispersions of pigments in aqueous dispersions of film-forming polymers which, upon drying as a thin layer, serve to bind the pigment particles to each other and to the supporting surface. Many kinds of film-forming polymer aqueous dispersions that are suitable for use as, or in making of, pigmented coating compositions are already known, and reference can be made to the prior art for the kinds of polymer and copolymer compositions and for methods of making aqueous dispersion of such compositions that are suitable for making pigmented coatings compositions. Among the aqueous dispersions or latexes of rubber-like or non-rubber-like resinous plastic polymer materials that have been described as suitable for making pigmented coatings compositions are film-forming latexes of the following kinds of polymers and copolymers:

Polymers of vinyl and vinylidene compounds, e.g. of conjugated aliphatic dienes such as 1,3-butadiene (herein otherwise referred to simply as "butadiene"), isoprene, 2,3-dimethyl-1,3-butadiene, piperylene, chloroprene, and 2,3-dichloro-1,3-butadiene; alpha-olefins such as ethylene, propylene, butene, isobutene; vinyl esters such as vinyl chloride and vinyl acetate; vinyl ethers; vinyl ketones; vinylidene chloride; vinylidene cyanide; acrylates such as acrylic and methacrylic acids, esters, nitriles, amides, and aldehydes; and styrene compounds such as styrene, vinyltoluene, α-methylstyrene, isopropenyltoluene, divinylbenzene, ar-chlorostyrene, ar-dichlorostyrene, ar-methoxystyrene, vinylnaphthalene, vinylcarbazole, and vinyl pyridine; and drying-oil-modified polymers;

Copolymers of two or more of the above, especially copolymers of one or more of the conjugated dienes and one or more of the monovinyl- or mono-vinylidene compounds copolymerizable therewith, such as copolymers of butadiene and styrene, butadiene and acrylonitrile, isoprene and isobutylene; also copolymers of two or more mono-vinylidene compounds, e.g. vinyl chloride and vinyl acetate, vinyl chloride and vinylidene chloride, and acrylonitrile and isobutylene; and Plasticized homopolymers and plasticized resinous copolymers of kinds that are not usually film-forming except when so plasticized, such as plasticized polystyrene latex and plasticized polymeric vinyltoluene latex.

Mixtures of polymer latexes can also be used, e.g. a mixture of a butadiene-styrene copolymer latex and a butadiene-acrylonitrile latex, or a mixture of a butadiene-styrene latex and a plasticized polystyrene latex.

Film-forming polymer dispersions for aqueous latex paints are usually prepared by emulsion polymerization in well-known ways. For the present purposes, it is desirable that the paint latex be non-acidic, i.e. neutral or alkaline, and that the emulsifiers present therein be principally anionic or non-ionic emulsifiers. If cationic emulsifiers are present, it is desirable that sufficient non-ionic emulsifier also be present so that the latex is not appreciably unstable relative to metal ions.

Specific examples of film-forming polymer aqueous dispersions that are suitable for the present purposes are found in U.S. Patent 2,498,712 by Laurence L. Ryden, which describes water-emulsion paints formulated from film-forming aqueous dispersions of copolymers of mixtures of polymerizable unsaturated organic compounds, including a monovinylaromatic hydrocarbon and an aliphatic conjugated diolefin. The preferred copolymers are described as containing from 40 to 60 mole percent of an aliphatic conjugated diolefin such as 1,3-butadiene or isoprene, and at least 15 mole percent of a monovinylaromatic hydrocarbon such as styrene, vinyltoluene, and ar-ethylstyrene, including multi-polymers containing, in addition to the aliphatic conjugated diolefin and monovinylaromatic hydrocarbon, another copolymerizable vinylidene compound such as methyl methacrylate, vinyl chloride, or vinylidene chloride, The patent also shows a method of making such copolymer aqueous dispersions, and describes making water-base paints from such dispersions.

Further examples of film-forming ternary copolymer aqueous dispersions are disclosed in U.S. Patent 2,476,967 by E. L. Fiedler, including copolymers of from 15 to 50 percent by weight of a monovinyl aromatic compound (such as styrene, ar-methylstyrene, ar-ethylstyrene, ar-isopropylstyrene, or vinylnaphthalene), from 35 to 60 percent of a conjugated diolefin (such as 1,3-butadiene, isoprene, or 2,3-dimethyl-1,3-butadiene), and up to 25 percent of a vinylidene halide (such as vinylidene chloride).

Film-forming aqueous dispersions comprising drying-oil fatty acid esters and copolymers of from 25 to 66 mole percent of diolefin are described in U.S. 2,492,124 by A. E. Young and E. K. Stilbert, who also described paper-coating compositions in U.S. Patent 2,537,114.

A definitive and simple test of suitability of an aqueous film-forming polymer dispersion for use in making the improved coatings compositions of this invention can be carried out as follows. To a sample of a neutral or alkaline aqueous polymer dispersion to be tested, containing at least 5 and not more than 65, preferably from 25 to 55, percent by weight of polymer, is added one or more of the solid pigments such as lithopone or titanium dioxide that are conventionally employed to make water-base paints but not including zinc oxide or calcium sulfate-containing pigments, usually in amount such that the resulting composition contains not more than about 70 percent by weight total solid material, in which there is from 15 to 100 parts by weight of polymer solids per 100 parts by weight of pigment solids. The resulting pigmented polymer aqueous dispersion is then spread as a thin layer on a solid supporting surface such as a surface of primed metal and allowed to dry. Aqueous polymer dispersions suitable for the present purposes are deemed to be ones that in the foregoing test (1) are compatible with usual water-base paint pigments (excluding zinc oxide and calcium sulfate-containing pigments), i.e. that do not coagulate or thicken when admixed with such pigments, and (2) form a substantially continuous, coherent and adherent film when the pigmented compositions are dried as a thin layer on a solid suporting surface.

While the improved coating compositions of this invention can be made from any film-forming polymer aqueous dispersions that pass the foregoing test, the present invention is advantageously employed with those polymer aqueous dispersion that are not compatible with reactive pigments, i.e. that thicken or coagulate when admixed with pigments that supply an appreciable concentration of polyvalent metal cations to the aqueous medium of the dispersion. Stable coating compositions can be obtained from such film-forming polymer aqueous dispersions and such reactive pigments by incorporating in the composition a glycolamine of the kind hereinbefore described.

Accordingly, the improved coating compositions of this invention comprise a film-forming polymer aqueous dispersion, a glycolamine stabilizer, and a pigment composition. The invention is especially advantageous in the preparation of stable compositions from reactive pigments such as ordinary zinc oxide pigments and/or pigments that comprise calcium sulfate, e.g. calcium sulfate-extended titanium dioxide pigments. In addition to the reactive pigment, the pigment composition can comprise other finely divided solid pigments, pigment extenders, fillers or the like that are conventionally used in compounding water-base paints, such as lithopone, titanium oxide, zinc sulfide, iron oxides, mica, china clay, mineral silicates, and coloriferous agents. Pigment formulations that are adapted for various coatings purposes, such as for exterior paints, are already well known in the art. The pigment composition is usually prepared as an aqueous paste by mixing the solid pigment ingredients with water before adding the polymer dispersion. The pigment paste may contain a small amount, e.g. 0.5 percent by weight of the pigment, of a pigment dispersing or deflocculating agent such as tetrasodium pyrophosphate or potassium tripolyphosphate, and/or up to about 3 percent of the weight of the pigment of a water-dispersible protective colloid such as a partially hydrolyzed polymer of vinyl acetate, a water-soluble cellulosic ether (methyl cellulose), proteinaceous materials (casein), and alginates, but these are not required and may be omitted.

The coating compositions may contain a wide range of relative proportions of pigment, polymer, and aqueous medium, depending upon the intended use. Usually, the compositions contain from about 30 to about 70, preferably from about 40 to about 65, percent by weight total solids, which solids contain from about 15 to about 100 parts of polymer solids per 100 parts, by weight, of pigment solid, although more or less than these proportions can be employed.

In order that these pigmented film-forming polymer aqueous dispersions that contain reactive pigments be stable, i.e. remain smoothly dispersed, without appreciable thickening or coagulation, during storage after compounding and before use, it is advantageous to incorporate in such dispersions from about 3 to about 20 parts by weight of a glycolamine stabilizer of the kind hereinbefore described per 100 parts of the polymer solid material in the dispersion. Within the range just stated, the optimum amount of stabilizer that is employed is usually greater in compositions that comprise larger proportions of reactive pigment and in compositions that comprise polymer dispersions that are particularly susceptible to thickening or coagulation by such reactive pigments. In some instances where the reactive pigment-containing film-forming polymer aqueous coating composition is to be used up soon after its formulation, the composition can be satisfactorily stabilized by incorporating a smaller proportion of the glycolamine stabilizer than would be necessary to maintain stability in the composition for a longer period of time such as is encountered in ready-mixed latex paints that may stand on dealers' shelves for many months before use.

The glycolamine stabilizer can be incorporated in the composition at any stage of its preparation. Since pigmented latex coating compositions are usually prepared by admixing a pigment aqueous paste mixture with a polymer aqueous dispersion, the stabilizer is preferably added to at least one of these aqueous dispersions, i.e. to either or to both the pigment aqueous dispersion and the polymer aqueous dispersion, and the resulting dispersions are admixed together. If desired, the stabilizer can be added to the pigmented coating composition after admixing all of the other ingredients, provided that the stabilizer is added to such a composition before an objectionable degree of thickening thereof has taken place. The glycolamine stabilizers of this invention are effective in delaying or preventing thickening of compositions of polymer dispersions comprising reactive pigments, but these glycolamines are not effective in redispersing already-coagulated compositions.

The following examples illustrate the invention, but should not be construed as limiting its scope. In the examples, parts and percentages are by weight.

EXAMPLE 1

A pigment paste was prepared by admixing the following ingredients in proportions as shown:

| | Parts |
|---|---|
| Zinc oxide, American process, common pigment grade | 40 |
| Titanium oxide, rutile type, common pigment grade | 40 |
| Mica, 325 mesh, water-ground | 20 |
| Water-soluble methyl ethers of cellulose, 100 cps., aqueous 4 percent solution | 35 |
| Sodium pentachlorophenate, aqueous 10 percent solution | 4 |
| Tributyl phosphate | 1 |
| Pine oil | 0.36 |
| Water | 55.64 |
| Glycolamine, identified hereinafter, aqueous 50 percent dispersion | 4 |

A pigmented film-forming polymer dispersion was made by admixing 200 parts of the pigment paste just described and 71 parts of a butadiene-styrene copolymer aqueous "latex" containing approximately 48 percent of a copolymer of about 60 percent styrene and about 40 percent 1,3-butadiene colloidally dispersed therein.

In the manner just described there was prepared a series of test compositions, each of which contained a different one of the glycolamines identified in the table. The compositions were placed in sealed containers and were allowed to stand in storage at room temperature. Occasionally, the test compositions were examined. In the table, the condition of the compositions is indicated as "OK," signifying that the composition was smoothly dispersed and suitable for use as a paint, or as "coagulated," signifying that the composition had thickened or coagulated to a degree rendering the composition unsuited for use as a paint.

The glycolamines identified in tests 1 through 10 are examples of stabilizers within the scope of this invention. The glycolamines identified in tests 11 through 14 are for purpose of contrast and are outside the scope of this invention.

The glycolamines employed in making the compositions hereindescribed were products of condensation of ethylene oxide with long chain primary aliphatic amines in the presence of alkali, and had the following generic formula:

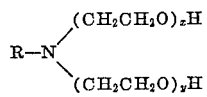

In the table, the glycolamines are identified by identification of the radical R—, the average number of ethoxy units, i.e., $x+y$, the average molecular weight and, the cloud point temperature of a 10 percent by weight solution of the glycolamine in water.

It will be observed in the table that the compositions which were still smoothly dispersed after 5½ months storage were those in which the glycolamine ingredient was one whose 10 percent aqueous solution had a cloud point temperature below 95° C. The compositions that coagulated soon after preparation were those in which the glycolamine ingredient was insoluble in water or whose 10 percent aqueous solution had a cloud point temperature above 100° C.

|  |  | Parts |
|---|---|---|
| Water-soluble methyl ethers of cellulose, 4000 cps., aqueous 2.5 percent solution | | 96 |
| Latex (described below) | | 256 |
| Preservative, sodium o-phenylphenate, aqueous 20 percent solution | | 16.5 |
| Antifoamer | | 8 |

The latex used was an alkaline dispersion containing about 48 percent by weight of a copolymer of approximately 60 percent by weight styrene and approximately 40 percent 1,3-butadiene. The latex also contained, as a stabilizer for the reactive pigment, 6 parts of a glycolamine per 100 parts of the copolymer (dry basis), the glycolamine being substantially like that described in test 9 of Example 1, i.e. the condensation product of 5 weight-moles of ethylene oxide with one weight-mole equivalent of a mixture of aliphatic primary amines derived from coconut oil fatty acids, having a cloud point temperature (10 percent aqueous solution) of 92.5° C.

The resulting smoothly dispersed paint composition was stored at room temperature in a closed container. After two months, the dispersion was still smoothly dispersed, the viscosity was not changed, and the composition was well suited for coating purposes.

In contrast to the foregoing example, when the calcium sulfate-containing pigment paste was admixed with a butadiene-styrene latex that did not contain a glycolamine stabilizer, the mixture thickened and coagulated almost at once and was unsuited for use as a coating material.

In place of the specific pigment paste composition employed in the foregoing illustrations other pigment formulations comprising reactive pigments, such as zinc oxide and/or calcium sulfate-containing pigments, can

Table

| Test | Aliphatic Radical R— | Total Ethoxy Units, $x+y$ Average | Molecular Weight, Average | Cloud Point, ° C. | Condition of Paint Dispersions |
|---|---|---|---|---|---|
| 1 | Octyl, $C_8$ | 3 | 261 | 42 | OK at 5½ months. |
| 2 | Octyl, $C_8$ | 6 | 393 | 83 | Do. |
| 3 | Decyl, $C_{10}$ | 6 | 421 | 67 | Do. |
| 4 | Dodecyl, $C_{12}$ | 5 | 405 | 55 | Do. |
| 5 | Dodecyl, $C_{12}$ | 7 | 493 | 71 | Do. |
| 6 | Tetradecyl, $C_{14}$ | 5 | 433 | 79 | Do. |
| 7 | Octadecyl, $C_{18}$ | 5 | 489 | 88.5 | Do. |
| 8 | Mixed (note 1) avg. $C_{13}$ | 2 | 287 | 50 | Do. |
| 9 | Mixed (note 1) avg. $C_{13}$ | 5 | 419 | 92.5 | Do. |
| 10 | Mixed (note 2) avg. $C_{18}$ | 10 | 709 | 78 | Do. |
| 11 | Mixed (note 1) avg. $C_{13}$ | 15 | 859 | >100 | Coagulated within 24 hrs. |
| 12 | Octadecyl, $C_{18}$ | 2 | 357 | insol. | Do. |
| 13 | Octadecyl, $C_{18}$ | 15 | 929 | >100 | Do. |
| 14 | Octadecyl, $C_{18}$ | 50 | 2,469 | >100 | Do. |
| 15 | None, test blank | | | | Do. |

NOTE 1.—Mixed aliphatic amines derived from coconut oil fatty acids containing about 8 percent octylamine, 9 percent decylamine, 47 percent dodecylamine, 18 percent tetradecylamine, 8 percent hexadecylamine, 5 percent octadecylamine, and 5 percent octadecenylamine.

NOTE 2.—Mixed aliphatic amines derived from tallow fatty acids.

EXAMPLE 2

A pigment paste was prepared by admixing the following essential ingredients in proportions as shown:

|  | Parts |
|---|---|
| Calcium sulfate-extended titanium dioxide pigment (coprecipitated, containing 30 percent titanium dioxide and 70 percent calcium sulfate | 472 |
| Water | 222 | together with small amounts of pigment dispersing agent and anti-foamer, and the paste was run through a paint mill. The milled paste was let-down by admixing therewith the following ingredients in the proportions shown:

be used. In place of the film-forming styrene-butadiene copolymer aqueous dispersion there can be employed another film-forming resinous or elastomeric polymer aqueous dispersion as hereinbefore described. In place of the specific glycolamines employed, there can be used other glycolamines within the scope as hereinbefore defined.

Polymer aqueous dispersions that contain glycolamines according to this invention are also advantageous in that such dispersions are more stable in the presence of soluble compounds of polyvalent metal cations that normally tend to coagulate the dispersion. For example, more calcium chloride can be added to a butadiene-styrene copolymer dispersion that contains a glycolamine according to this invention than can be added to such a dispersion that does not contain a glycolamine stabilizer. It has also been observed that the presence of glycolamine according to this invention often enhances the tinctorial strength of certain coloring agents in the pigmented coating compositions, i.e., the brilliance and quality of color of the tinted composition when dried as a thin layer on a solid supporting surface is often noticeably better when the composition contains a glycolamine stabilizer than when such a stabilizer is absent. The presence of a glycolamine according to this invention also confers fugicidal properties upon the composition, i.e., the coating compositions comprising a glycolamine stabilizer are more resistant to the growth of fungi, either in the aqueous dispersion or on the coated surface, than are similar dispersions that do not contain the glycolamine stabilizer.

We claim:

1. A film-forming, non-acidic, aqueous coating composition comprising a pigment selected from the group consisting of zinc oxide and calcium sulfate-extended titanium dioxide, a film-forming polymer aqueous dispersion that is normally disposed to thicken when mixed with such pigment and wherein the polymer is an addition polymer of an ethylenically unsaturated monomer, and a glycolamine stabilizer having the formula

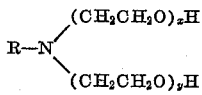

wherein the symbol R— represents an aliphatic radical having from 8 to 18 carbon atoms and the symbols $x$ and $y$ are integers the sum of which is from 2 to 10, which glycolamine is soluble in water to form a 10 percent by weight solution that has a cloud point temperature of not more than 95° C., the glycolamine being present in amount corresponding to from 3 to 20 parts by weight per 100 parts by weight of the polymer.

2. A composition according to claim 1 wherein there are from 15 to 100 parts by weight of polymer per 100 parts by weight of total pigment and from 30 to 70 percent by weight of total solid matter in the composition.

3. A composition according to claim 2 wherein the pigment is zinc oxide.

4. A composition according to claim 2 wherein the pigment is a calcium sulfate-extended titanium dioxide.

5. A composition according to claim 2 wherein the polymer is a film-forming copolymer of styrene and 1,3-butadiene and the pigment is zinc oxide.

6. A composition according to claim 2 wherein the polymer is a film-forming copolymer of styrene and 1,3-butadiene and the pigment is a calcium sulfate-extended titanium dioxide.

7. A composition according to claim 2 wherein the polymer is a film-forming aliphatic conjugated diene polymer.

8. A composition according to claim 2 wherein the polymer is a film-forming monovinylaromatic compound polymer.

9. A composition according to claim 2 wherein the polymer is a film-forming copolymer of styrene and 1,3-butadiene.

10. In a method of making an aqueous coating composition by mixing a pigment selected from the group consisting of zinc oxide and calcium sulfate-extended titanium dioxide and a film-forming polymer non-acidic aqueous dispersion that normally thickens and becomes unsuited for use as a coating composition when mixed with such pigment and wherein the polymer is an addition polymer of an ethylenically unsaturated monomer, the improvement that comprises incorporating in the coating composition a glycolamine stabilizer having the formula

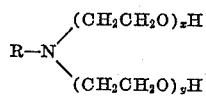

wherein the symbol R— represents an aliphatic radical having from 8 to 18 carbon atoms and the symbols $x$ and $y$ are integers the sum of which is from 2 to 10, which glycolamine is soluble in water to form a 10 percent by weight solution that has a cloud point temperature of not more than 95° C., the glycolamine being employed in amount corresponding to from 3 to 20 parts by weight per 100 parts by weight of the polymer.

11. The method according to claim 10 wherein the starting pigment and film-forming polymer dispersion are employed in amounts corresponding to from 15 to 100 parts by weight of polymer per 100 parts by weight of total pigment and from 30 to 70 percent by weight of total solid matter in the resulting composition.

12. The improvement according to claim 11 wherein the pigment is zinc oxide.

13. The improvement according to claim 11 wherein the pigment is a calcium sulfate-extended titanium dioxide.

14. The improvement according to claim 11 wherein the polymer is a film-forming copolymer of styrene and 1,3-butadiene.

15. The improvement according to claim 11 wherein the pigment is zinc oxide and the polymer is a film-forming copolymer of styrene and 1,3-butadiene.

16. The improvement according to claim 11 wherein the pigment is a calcium sulfate-extended titanium dioxide and the polymer is a film-forming copolymer of styrene and 1,3-butadiene.

References Cited in the file of this patent

UNITED STATES PATENTS

| 1,970,578 | Schoeller et al. | Aug. 21, 1934 |
| 2,341,994 | Kingsbury | Feb. 15, 1944 |
| 2,343,400 | Hopff et al. | Feb. 22, 1944 |
| 2,377,753 | Brubaker | June 5, 1945 |
| 2,809,948 | Hunter | Oct. 15, 1957 |

FOREIGN PATENTS

| 118,040 | Australia | Jan. 18, 1944 |

OTHER REFERENCES

McGill et al.: Paint, Oil & Chemical Review, December 4, 1952, pages 102–105.